United States Patent [19]

Hiereth

[11] Patent Number: 4,959,961
[45] Date of Patent: Oct. 2, 1990

[54] SUPERCHARGED INTERNAL COMBUSTION ENGINE

[75] Inventor: Hermann Hiereth, Esslingen, Fed. Rep. of Germany

[73] Assignee: Daimler-Benz Aktiengesellschaft, Stuttgart, Fed. Rep. of Germany

[21] Appl. No.: 347,055

[22] Filed: May 4, 1989

[30] Foreign Application Priority Data

May 10, 1988 [DE] Fed. Rep. of Germany ....... 3815991

[51] Int. Cl.⁵ .............................................. F02B 37/00
[52] U.S. Cl. ...................................... 60/612; 123/432
[58] Field of Search ................... 60/609, 612; 123/432

[56] References Cited

U.S. PATENT DOCUMENTS 2,380,777  7/1945  Moss ................................. 60/612 X
4,538,574  9/1985  Lombardi ......................... 60/612 X

FOREIGN PATENT DOCUMENTS 32976  3/1980  Japan .................................... 123/432
1247573  7/1986  U.S.S.R. ................................. 60/609
2005765  4/1979  United Kingdom .................. 60/612

Primary Examiner—Michael Koczo
Attorney, Agent, or Firm—Evenson, Wands, Edwards, Lenahan & McKeown

[57] ABSTRACT

The invention concerns a supercharged internal combustion engine in which two inlet ducts, which can be closed by inlet valves and whose flows are separated from one another, and two exhaust ducts which can be closed by exhaust valves enter the combustion space of a cylinder, one inlet duct and one exhaust duct being associated with one exhaust gas turbocharger. In order to achieve both a rapid build-up of supercharge pressure in the case of positive load changes and also an optimum homogenization of the mixture in the combustion space, the two exhaust ducts are also arranged so that their flows are separated and the inlet and exhaust side connected to the same exhaust gas turbocharger can be closed by one shut-off element each.

8 Claims, 1 Drawing Sheet

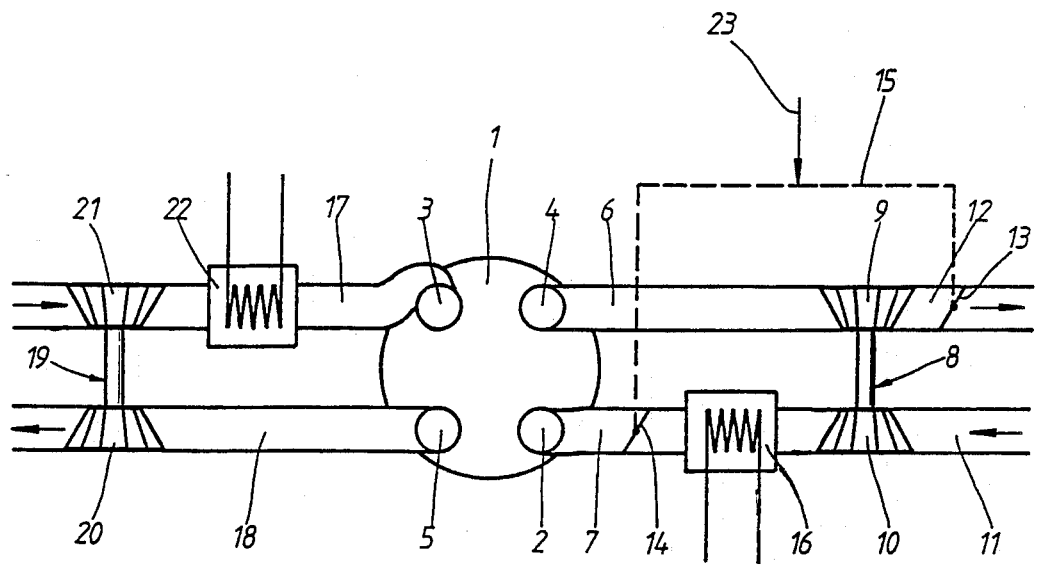

SUPERCHARGED INTERNAL COMBUSTION ENGINE

BACKGROUND AND SUMMARY OF THE INVENTION

The present invention generally concerns a supercharged internal combustion engine and more particularly to a supercharged internal combustion engine having a pair of turbochargers each connected between separate inlet and outlet ducts which can be selectively closed to improve the performance of the engine.

An internal combustion engine capable of supercharging disclosed in JP-A 61-210224 provides for the admission to the two exhaust gas turbochargers to be always equal over the whole load and rotational speed range. In consequence, only relatively low exhaust gas flow velocities are available in the lower rotational speed ranges. The supercharge rotational speeds are therefore so low that there is only a very sluggish build-up of supercharge pressure in the case of a positive change of load. The flow velocities in these operating ranges are also low on the inlet side of the supercharger so that, because of the reduced turbulence in the combustion space of the internal combustion engine, satisfactory mixture formation is not ensured, particularly in the case of diesel engines.

An internal combustion engine which is supercharged by two exhaust gas turbochargers, of which one can be put out of operation, if required, by means of shut-off elements in the exhaust and inlet regions, is disclosed from German Patent (DE-PS) 850 965. The flows in the inlet and exhaust ducts of the two turbochargers are connected together so that the two supercharged devices act like a single turbocharger when a second turbocharger is added. However, German Patent (DE-PS) 850 965 gives no information on how the individual inlet and exhaust ducts are to be arranged in the case where a four-valve cylinder head is used.

In JP-A 60-79123, it is disclosed to arrange the valves on a four-valve cylinder head in such a way that with respect to a hypothetical square, whose corners are formed by the two inlet and exhaust valves, the two inlet valves lie on one diagonal and the two exhaust valves lie on the other diagonal.

An object of the present invention is to produce a supercharged internal combustion engine having a pair of exhaust gas turbochargers each connected between separate inlet and outlet ducts which are selectively closed to provide a clearly improved build-up of supercharge pressure in the case of a positive change in load.

It is a further object of the present invention to provide a supercharged internal combustion engine wherein optimum mixture formation in the combustion space can be achieved even in the lower rotational speed ranges.

The invention achieves these and other objects by providing a shut off element at each of an inlet side and an exhaust side connected to the same turbocharger which can be selectively closed to improve engine performance.

Because, in the internal combustion engine according to certain preferred embodiments of the present invention, one of the two exhaust gas turbochargers can be separated from both the turbine side and the compressor side by suitable shut-off elements, it is possible for the whole of the exhaust gas of a cylinder to be pumped to the turbine via one exhaust duct only. In consequence, the exhaust gas achieves a relatively high flow velocity. The supercharger rotational speed can therefore be held at a relatively high level even in the lowest rotational speed ranges when one exhaust gas turbocharger is separated from the system so that a rapid build-up of supercharge pressure is ensured in the case of a positive change in load.

In accordance with further preferred embodiments of the present invention, as on the exhaust side, the whole of the induced gases flow into the combustion space via only one inlet duct instead of two when one exhaust gas turbocharger is separated from the system. This, of course, again leads to a higher flow velocity so that optimum conditions for intensive mixing of the fuel with the combustion air are present even in the lower rotational speed ranges.

The mixture formation is improved still further according to further preferred embodiments of the invention if the inlet duct on the non-closable inlet side is, in addition, designed as a swirl duct. By this means, optimum adaptation of the swirl level necessary in the cylinder is provided for good mixture formation over various load and rotational speed conditions of the internal combustion engine by appropriately switching on or off one exhaust gas turbocharger. If the non-closable inlet duct is designed with, for example, high swirl, the swirl in the cylinder can be held substantially constant over the whole rotational speed range of the internal combustion engine by the addition, if appropriate, of a weak-swirl second inlet duct. On the other hand, however, high turbulence levels can be generated in high rotational speed ranges in the case of spark-ignition engines, for example.

The diagonal arrangement of the valves in accordance with the teachings of the present invention is advantageous in that it ensures an optimum heat distribution in the cylinder head, in contrast to the arrangement with inlet and exhaust valves parallel to the engine axis, in which the temperature drop between the hot exhaust side and the cold (relative to the exhaust side) inlet side is very large.

Other objects, advantages and novel features of the present invention will become apparent from the following detailed description of the invention when considered in conjunction with the accompanying drawings.

BRIEF DESCRIPTION OF THE DRAWING

The single Figure shows an embodiment of an internal combustion engine according to the teachings of the present invention in a diagrammatic representation.

DETAILED DESCRIPTION OF THE DRAWING

A combustion space of an internal combustion engine, in which the gas exchange is controlled by two inlet valves 2 and 3 located diagonally opposite to one another and two exhaust valves 4 and 5 also arranged diagonally opposite to one another, is indicated in plan view by 1. The exhaust valve 4 is located in a first exhaust duct 6 and the inlet valve 2 in a first inlet duct 7.

Also provided is a first exhaust gas turbocharger 8 whose turbine 9 can be subjected to exhaust gas via the first exhaust duct 6 and whose compressor 10 pumps the fresh air induced via the induction pipe 11 through the inlet duct 7 into the combustion space 1.

Butterfly valves 13 and 14 are respectively located in an exhaust gas pipe 12 connected to the turbine 9 and in the inlet duct 7; these butterfly valves 13 and 14 can each be held in only the closed or open position. The two butterfly valves 13 and 14 are connected with one another by the actuation linkage 15, shown by the dotted lines in the drawing, in such a way that completely synchronous actuation of the two butterfly valves 13 and 14 can be achieved. A supercharge air cooler 16 is provided between the butterfly valve 14 and the compressor 10.

The inlet valve 3 is located in a further inlet duct 17, which is preferably designed as a swirl duct in the region of the inlet into the combustion space 1, and the exhaust valve 5 is located in a further exhaust duct 18. An exhaust gas turbocharger 19 is also provided on this valve side; the turbine 20 of this supercharger can be subjected to exhaust gas and its compressor 21 pumps the fresh air in the direction of the combustion space 1. Heat is again extracted from the supercharged air by a cooler 22.

During the operation of the internal combustion engine, both butterfly valves 13 and 14 are held in the closed position in the lower speed range, i.e. up to a specified engine rotational speed limiting value $n_G$, so that the exhaust gas turbocharger 8 is inoperative and the gas exchange in combustion space 1 takes place exclusively by the two valves 3 and 5. The fresh air pumped by the compressor 21 then flows through the swirl-type inlet duct 17 with increased swirl into the combustion space 1 of the internal combustion engine. Because of the fact that all the fresh gases are fed into the combustion space 1 via the inlet duct 17 only, there is a high flow velocity in this duct 17 and this has a positive effect on the swirl and turbulence generation in the combustion space 1.

In a manner analogous to the inlet side, the exhaust gases flow with a relatively high flow velocity, because the exhaust duct 6 is closed, through the exhaust duct 18 to the turbine 20. This high exhaust gas flow velocity therefore ensures a high rotational speed level of the exhaust gas turbocharger 19 even in the lower engine rotational speed range so that this turbocharger responds very rapidly, for example after a positive change in load.

In the medium and high rotational speed ranges, i.e. after attainment of the specified engine rotational speed limiting value $n_G$, the two butterfly valves 13 and 14 are switched to the open position with appropriate actuation of the linkage 15 by a suitable servodrive or the like (symbolically represented by the arrow 23). The two valves 2 and 4 then resume participation in the gas exchange control, i.e. the exhaust gases now flow via both turbines 9 and 20 and the fresh gases are pumped via both compressors 10 and 21 in to the combustion space 1. The fresh gas flow entering the combustion space 1 via the inlet duct 7, which is designed to have practically no swirl, then acts to support the swirl motion of the fresh gases flowing in via the inlet duct 17.

Actuation of the two butterfly valves 13 and 14 as a function of rotational speed can, of course, be replaced by actuation as a function of other operating parameters of the internal combustion engine, such as the internal combustion engine load.

The position of the two butterfly valves 13 and 14 is not limited to that shown in the single Figure. The butterfly valves 13 and 14 can be located at any given position on the outlet and inlet sides i.e. also, for example, upstream of the turbine 9 and upstream of the compressor 10. In addition, it is also conceivable to separate one exhaust gas turbocharger from the system by putting the two valves 2 and 4 themselves out of operation directly instead of by means of two butterfly valves.

The invention is not, of course, limited to single-cylinder internal combustion engines only. In the case of a multiplicity of cylinders, several exhaust ducts and several inlet ducts of one turbocharger side can, of course, be respectively combined into one collecting main. It is only necessary to ensure that the flows of the inlet and exhaust ducts of one turbocharger side are always separated from those of the other turbocharger side.

In order to utilize momentum, it is also conceivable - in the case of 6, 8 or 12 cylinder internal combustion engines - to use two exhaust gas turbochargers with twin-flow casings.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Supercharged internal combustion engine in which two inlet ducts, each of which can be closed by an inlet valve, and two exhaust ducts, each of which can be closed by an exhaust valve, enter a combustion space and in which one inlet duct and one exhaust duct are connected to a compressor and turbine, respectively, of a first exhaust gas turbocharger and the other inlet duct and exhaust duct are connected to a compressor and turbine, respectively, of a second exhaust gas turbocharger, the two inlet ducts being arranged so that flows therethrough are separate from one another and the two exhaust ducts being arranged so that flows therethrough are separate from one another, wherein one of the first and second exhaust gas turbochargers has an inlet and an outlet, and a shut-off element operatively associated with the inlet and outlet selectively shuts off the inlet and outlet.

2. Supercharged internal combustion engine according to claim 1, wherein the shut-off element closing the exhaust is a butterfly valve located in an exhaust gas pipe provided downstream of the turbine, and the shut-off element closing the inlet is a butterfly valve located in an inlet duct.

3. Supercharged internal combustion engine according to claim 1, wherein means is provided for closing each shut-off element below a predetermined value of an internal combustion engine rotational speed.

4. Supercharged internal combustion engine according to claim 2, wherein means is provided for holding both butterfly valves in the closed position below a specified limiting vale $n_g$ of an internal combustion engine rotational speed.

5. Supercharged internal combustion engine according to claim 2, wherein the two butterfly valves are coupled together by a device which produces their synchronous displacement.

6. Supercharged internal combustion engine according to claim 1, wherein with respect to a hypothetical square having corners formed by the two inlet valves and the two exhaust valves, the two inlet valves lie on one diagonal of the square and the two exhaust valves lie on another diagonal of the square.

7. Supercharged internal combustion engine according to claim 1, wherein the inlet duct of the inlet side which does not have a shut-off element is designed as a swirl duct.

8. Supercharged internal combustion engine according to claim 1, wherein the two inlet ducts have different swirl levels.

* * * * *